United States Patent [19]
Muto

[11] Patent Number: 4,877,696
[45] Date of Patent: Oct. 31, 1989

[54] COMPOSITE SLIDING STRUCTURE

[75] Inventor: Takashi Muto, Nagoya, Japan

[73] Assignee: Daido Metal Company, Nagoya, Japan

[21] Appl. No.: 129,388

[22] Filed: Nov. 24, 1987

[30] Foreign Application Priority Data

Dec. 15, 1986 [JP] Japan .................................. 61-296627

[51] Int. Cl.$^4$ ............................................. B32B 15/20
[52] U.S. Cl. ................................... 428/645; 428/652; 428/653
[58] Field of Search ............... 428/645, 652, 653, 674, 428/680

[56] References Cited

U.S. PATENT DOCUMENTS

| | | | |
|---|---|---|---|
| 2,386,951 | 10/1945 | Howe | 428/675 |
| 2,586,100 | 2/1952 | Schultz | 428/645 |
| 2,635,020 | 4/1953 | Beebe, Jr. | 428/645 |
| 3,180,008 | 4/1965 | Elderkin et al. | 428/645 |
| 4,188,079 | 2/1980 | Mori | 428/645 |

FOREIGN PATENT DOCUMENTS

| | | |
|---|---|---|
| 607628 | 2/1946 | United Kingdom . |
| 660389 | 12/1948 | United Kingdom . |
| 2175603 | 1/1986 | United Kingdom . |

Primary Examiner—Robert McDowell
Attorney, Agent, or Firm—Browdy and Neimark

[57] ABSTRACT

A composite sliding structure has a surface layer, a bond layer bonded to the surface layer, an intermediate layer bonded to the bond layer and a backing layer bonded to the intermediate layer. The surface layer is an alloy consisting essentially of 0.1–6.0% Cu and the balance Pb, an alloy consisting essentially of 0.1–6.0% Cu, 0.5–16.0% In and the balance Pb, an alloy consisting essentially of 0.5–16% In and the balance Pb, or any one of these alloys also containing 4% or less Sn. The bond layer is Cu, an alloy consisting essentially of 0.5–20.0% Zn and the balance Cu, an alloy consisting essentially of 0.1–4.0% Sn and the balance Cu, Ni, an alloy consisting essentially of 0.5–20.0% Zn and the balance Ni, or an alloy consisting essentially of 0.1–4% Sn and the balance Ni. The intermediate layer is Al, an alloy consisting essentially of 1.0–13.0% Si, 1.5–6.0% Zn and the balance Al, an alloy consisting essentially of 1.5–13.0% Si and the balance Al, an alloy consisting essentially of 0.1–4.0% Sn and the balance Al, or one of these alloys also containing, as additive, one or more elements selected from the group consisting of Cu, Mn, Cr, Zr, V, Pb and Sb by 4.0% or less. The backing metal layer is made of hard support material.

2 Claims, 2 Drawing Sheets

COMPOSITE SLIDING STRUCTURE

BACKGROUND OF THE INVENTION

The present invention relates to a composite sliding structure suitable for bearing portions or sliding portions of automobiles, ships, various kinds of electric machines, office automation equipments, agricultural machines, machine tools, food processing apparatus, and any other industrial machines.

There has been provided such a composite sliding structure composed of three layers, that is, a surface layer, an intermediate layer and a backing layer, For example, the surface layer is made of Pb-base alloy containing Sn of 4% or more, the intermediate layer being made of Cu-base alloy, and the backing layer is made of steel. Also, there has been provided a four layer structure of a surface layer, a bond layer, an intermediate layer and a backing layer. For instance, the surface layer is made of Pb base alloy containing Sn of 4% or more, the bond layer being made of Ni or Ni-alloy, the intermediate layer being made of Al base alloy, and the backing layer is made of steel. Alternatively, there has been a four layer composite sliding structure that contains 4% or more Sn in either of the surface layer and the intermediate layer.

In a case of bearing of an internal combustion engine, a bearing used at a high temperature or the like, Sn of the Pb-base alloy surface layer would be diffused into the intermediate layer of Cu-base bearing alloy, or into the bond layer of Cu or Cu-alloy, or into the bond layer of Ni or Ni-alloy, thereby forming a brittle intermetallic compound of Cu-Sn or Sn-Ni, resulting in reduction in fatigue strength. Also, Sn in the intermediate layer of Al base alloy would be diffused into the Cu or Cu alloy bond layer, thereby forming a brittle Sn-Cu intermetallic compound, resulting in reduction in fatigue strength of the sliding structure.

SUMMARY OF THE INVENTION

An object of the present invention is to solve a problem as to how much a content of Sn that causes the brittle intermetallic compound is suitable in order to improve the durability and fatigue-resistance of the composite sliding structure.

Another object of the invention is to determine a bond layer-forming alloy and/or an intermediate layer-forming alloy suitable for a surface layer in order to improve the durability and fatigue-resistance in a composite sliding structure in the case where the surface layer is composed of alloy selected from the group consisting of Pb-Cu alloy, Pb-Cu-In alloy, Pb-In alloy and each of these alloys containing Sn of not more than 4%.

According to a first aspect of the present invention, a composite sliding structure is composed of a surface layer, a bond layer bonded to the surface layer, an intermediate layer bonded to the bond layer and a backing layer bonded to the intermediate layer, the composite sliding structure being characterized in that the surface layer is made of any one selected from the group consisting of: an alloy consisting essentially of 0.1-6.0% Cu and the balance Pb; an alloy consisting essentially of 0.1-6.0% Cu, 0.5-16.0% In and the balance Pb; an alloy consisting essentially of 0.5-16% In and the balance Pb; and any one of these alloys containing Sn of not more than 4%, the bond layer being made of any one selected from the group consisting of: a single substance Cu; an alloy consisting essentially of 0.5-20.0% Zn and the balance Cu; an alloy consisting essentially of 0.1-4.0% Sn and the balance Cu; a single substance Ni; an alloy consisting essentially of 0.5-20.0% Zn and the balance Ni; and an alloy consisting essentially of 0.1-4.0% Sn and the balance Ni, the intermediate layer being made of any one selected from the group consisting of: a single substance Al, an alloy consisting essentially of 1.0-13.0% Si, 1.5-6.0% Zn and the balance Al; an alloy consisting essentially of 1.5-13.0% Si and the balance Al; an alloy consisting essentially of 0.1-4.0% Sn and the balance Al; and one of these alloys containing, as additive, one or more selected from the group consisting of Cu, Mn, Cr, Zr, V, Pb and Sb by 4.0% or less, and the backing metal layer is made of a hard support material such as steel.

According to a second aspect of the invention, a composite sliding structure is composed of a surface layer, an intermediate layer bonded to the surface layer and a backing metal layer bonded to the intermediate layer, the composite sliding structure being characterized in that the surface layer is made of any one selected from the group consisting of: an alloy consisting essentially of 0.1-6.0% Cu and the balance Pb; an alloy consisting essentially of 0.1-6.0% Cu, 0.5-16.0% In and the balance Pb; an alloy consisting essentially of 0.5-16% In and the balance Pb; and any one of these alloys containing Sn of not more than 4%, the intermediate layer being made of a single substance Cu or a Cu-base alloy containing, as additive, one or more selected from the group consisting of Pb of not more than 42.5%, Ni of not more than 2.0%, Ag of not more than 2.0%, Zn of not more than 17.0%, Sb of not more than 0.8%, P of not more than 0.6%, O of not more than 0.6%, and Sn of 0.1-4.0''%, the backing metal layer being made of hard support material such as steel.

With respect to the composition of the alloy forming the surface layer, if Cu is less than 0.1%, the effect of the addition of Cu will not occur, whereas if Cu exceeds 6.0%, the surface layer will become brittle disadvantageously. Therefore, the content of Cu is limited to 0.1-6.0%, more preferably, 3.2-5.5%. If a content of In is less than 0.5%, there will occur no effect of addition, whereas if the In content exceeds 16%, there will occur no adverse effect but the cost thereof would be increased. Therefore, In is limited to 0.5 to 16.0%, more preferably, 5.0-14.0%. If Sn is less than 0.5%, there will occur no effect of addition, whereas if Sn exceeds 4.0%, the bonding force between the surface layer and the bond layer or the intermediate layer will be degraded disadvantageously. Therefore, Sn is limited to 0.5-4.0%.

With respect to the composition of the alloy forming the bond layer, if Zn is less than 0.5%, such content will not be available in making crystalline grains of the bond layer-forming alloy fine during the plating process of Cu, whereas if Zn exceeds 20%, such content will not be available for improving the bonding or seizure-resisting property. Therefore, the content of Zn is limited to 0.5-20%. The content of Sn is limited to 0.5-4.0% for the same reason as in the content of Sn is limited to 0.5-4.0% for the same reason as in the content of Sn for the surface layer forming alloy.

With respect to the composition of the alloy forming the intermediate layer, Si serves to improve a mechanical property of the intermediate later. However, if Si is less than 1.5%, it effect will not occur, whereas Si exceeds 13%, the intermediate layer will be hardened. Therefore, the content of Si is limited to 1.5-13%. Also, Zn serves to improve the mechanical property of the intermediate layer. However, if the content of Zn is less than 1.5%, its effect will not occur, whereas if it exceeds 6.0%, the property of the intermediate layer will become degraded (the intermediate layer will become apt to be corroded). Thus, Zn is limited to 1.5-6.0%.

| Pb—Cu electric plating conditions | |
|---|---|
| Electric Plating Bath | Fluoronate bath containing lead fluoronate of 100 g/l, copper fluoronate of 2 g/l, fluoric acid of 60 g/l and resorcin of 3 g/l |
| Bath Temperature | 30° C. |
| Current Density | 3.0 A/dm$^2$ |
| Plating Time | 14 minutes |

| Indium electric-plating conditions | |
|---|---|
| Electric Plating Bath | Bath containing indium sulfamate of 30 g/l, sodium sufamine acid of 80 g/l and free sulfamine acid of 30 g/l |
| Bath Temperature | 30° C. |
| Current Density | 2.0 A/dm$^2$ |
| Plating Time | 3.5 minutes |

TABLE 2

| Kind | Sample No. | Chemical compositions of intermediate layer of Al-base alloy (wt %) | | | | | | | | |
|---|---|---|---|---|---|---|---|---|---|---|
| | | Sn | Cu | Ni | Si | Pb | Zn | Fe | Others | Al |
| The invention | 1 | 2.5–3.5 | 0.3–0.7 | — | 1.3–0.3 | 9.5–15.5 | — | not more than 0.7 | — | Balance |
| | 2 | — | 0.3–1.5 | — | 9.5–13.0 | — | — | — | — | Bal. |
| | 3 | — | 0.6–1.0 | — | 2.5–3.5 | 0.7–1.3 | 3.0–4.0 | not more than 0.7 | not more than 0.7%, containing Fe | Bal. |
| Materials for comparison | 4 | 5.5–7.0 | 0.7–1.3 | 0.7–1.3 | not more than 0.7 | — | — | not more than 0.7 | not more than 0.7%, Containing Fe | Bal. |
| | 5 | 15.0–19.0 | 0.7–0.9 | not more than 0.15 | not more than 0.3 | 1.0–2.4 0.08–0.52 | Sb than 0.7 | not more 0.7%, | not more than Containing Fe | Bal. |
| | 6 | 17.5–22.5 | 0.7–1.3 | not more than 0.15 | not more than 0.3 | — | — | not more than 0.7 | not more than 0.7%, Containing Fe | Bal. |
| | 7 | 26.5–32.5 | 0.7–1.3 | not more than 0.15 | not more than 0.3 | — | — | not more than 0.7 | — | Bal. |
| | 8 | 35.0–42.0 | 0.7–1.3 | not more than 0.15 | not more than 0.3 | — | — | not more than 0.7 | not more than 0.7%, containing Fe | Bal. |
| | 9 | 43–55 | — | — | — | — | — | — | — | Bal. |

DESCRIPTION OF THE PREFERRED EMBODIMENTS

The embodiments of the invention will now be described.

Figure 1:
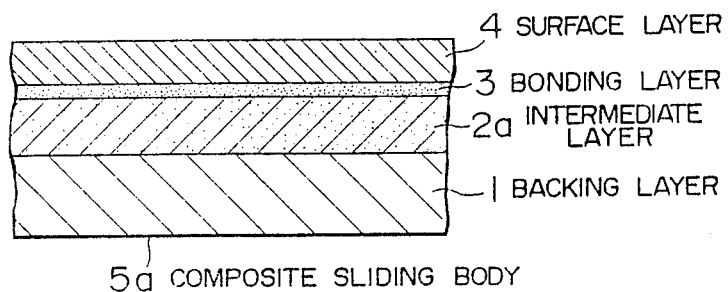
FIG. 1 is a cross-sectional view of a composite sliding structure in accordance with a first embodiment of the invention.

According to a first embodiment of the present invention, a thin plate of aluminum-base alloy having a thickness of 0.25 to 0.35 mm and a composition shown in Table 1 was pressure-bonded at a reduction rate of 40 to 48% at room temperature to a backing layer composed of a usual low carbon steel for structure use and having a thickness of 1.3 mm. Further, a Cu layer was formed onto the alloy layer by electric plating and an alloy layer forming a surface layer composed of 5% In, 2% Cu and the balance Pb is formed on the Cu layer by electric plating to thereby form a composite sliding structure shown in FIG. 1. The thickness of the intermediate layer was at 0.3 mm, the thickness of the bonding layer was at 1.5 microns, and the thickness of the surface layer was at 20 microns. The electric plating conditions were as follows.

With respect to the above-specified composite sliding structure, the bonding strength defined between the Cu bonding layer and the Al base alloy intermediate layer was measured within a week in accordance with an experimental method shown in Japanese Patent Unexamined Publication No. 180931/1973. The results are shown in Table 2.

TABLE 2

| Test piece No. | Bonding strength between bonding layer and intermediate layer (Kg/mm$^2$) | Bondabilits between bonding layer and intermediate layer | Kind |
|---|---|---|---|
| 1 | 8.5 | O* | The invention |
| 2 | 9.5 | O | |
| 3 | 9.5 | O | |
| 4 | 5.0 | X** | Material for comparison |
| 5 | 4.5 | X | |
| 6 | 4.5 | X | |
| 7 | 4.0 | X | |
| 8 | 2.9 | X | |

TABLE 2-continued

| Test piece No. | Bonding strength between bonding layer and intermediate layer (Kg/mm²) | Bondabilits between bonding layer and intermediate layer | Kind |
|---|---|---|---|
| 9 | 2.0 | X | |

*Sign (O) indicates a good bonding property.
**Sign (X) indicates an inferior bonding property.

As was apparent from the results showed in Table 2, it was found that in the composite sliding structure according to the present invention, the bonding strength between the bonding layer and the intermediate layer was extremely superior to that of the comparisons. Table 3 shows the relationship between the bonding strength defined between the bonding layers and the intermediate layers and the content of Sn included in the intermediate layers of the test pieces Nos. 1 to 9.

According to another embodiment of the present invention, another composite sliding structure having a bonding layer, an intermediate layer and a backing metal layer showed in Table 3 were produced in accordance with the same process as in the first embodiment.

Figure 2:
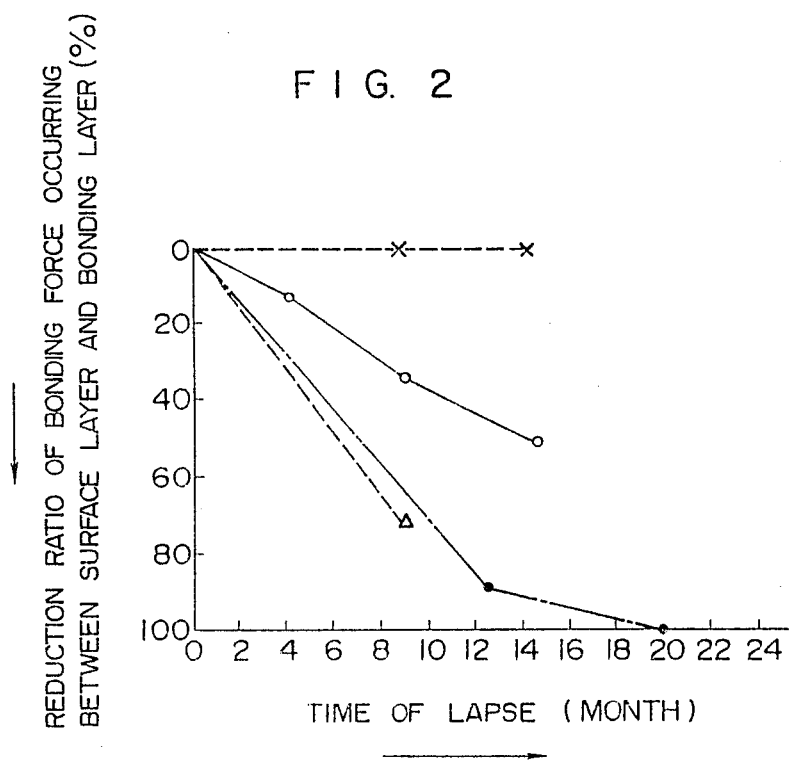
FIG. 2 is a graph showing a relationship between the time lapse and the reduction ratio of the bonding force between the surface layer and the bond surface.
Figure 3:
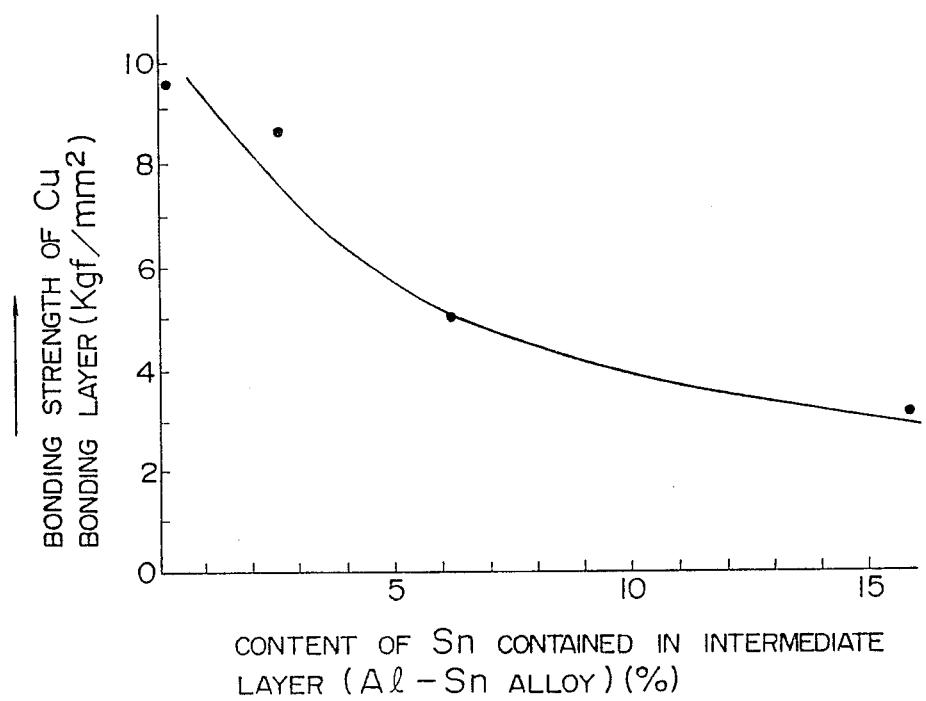
FIG. 3 is a graph showing the relationship between Sn% of the intermediate layer and the Cu bond layer regarding bonding strength.
Figure 4:
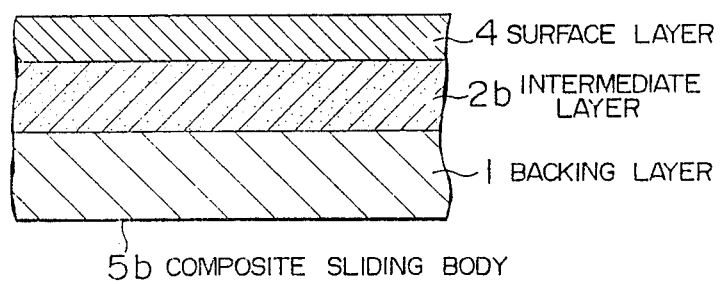
FIG. 4 is a cross-sectional view showing a composite sliding structure in accordance with a second embodiment of the invention.

FIG. 2 shows the results of the measurement of a decrease rate in adhesive forced defined between the surface layer and the bonding layer which rate relates to a service time lapse after the use of the composite sliding structure. As was apparent from FIG. 2, it was found that the decrease in bonding force defined between the surface layer and the bonding layer which decrease depends on the time lapse was improved in the composite sliding structure according to the present invention. The magnitude of the bonding force defined between the surface layer and the bonding layer (or the intermediate layer) was in strong correlation with the magnitude of the fatigue resistance. The increased bonding force means the increased fatigue resistance.

A second embodiment of the invention will now be described. Cu base alloy powders disposed on a backing metal layer made of a usual low carbon steel for structure use and having a composition showed in Table 4 and a thickness of 0.25 to 0.35 mm had been sintered for 7 to 12 minutes at a temperature of 810° to 870° C. Onto the thus sintered intermediate layer, there was provided, by electric plating in the same condition as in the first embodiment, an alloy surface layer composed of 5% In, 2% Cu and the balance Pb, thereby forming a composite sliding structure. The thickness of the intermediate layer, the surface layer and the backing metal layer were the same as those in the first embodiment.

TABLE

| Kind | Text piece No. | Composition of intermediate layer of Cu-base base alloy (wt %) | | | | | | |
|---|---|---|---|---|---|---|---|---|
| | | Sn | Pb | Ni or Ag | Zn | Fe | Others | Cu |
| Material for comparison | 14 | 9.0–11.0 | 9.0–11.0 | not more than 0.5 | not more than 0.75 | — | — | Balance |
| | 15 | 3.0–4.0 | 21.0—25.0 | not more than 0.5 | not more than 0.3 | — | — | Balance |
| | 16 | 3.0–4.0 | 21.0–25.0 | not more than 0.5 | — | not more than 0.3 | not more than 1.0, containing Fe | Balance |
| The Invention | 17 | 1.1–1.9 | 21.0–25.0 | not more than 0.5 | — | not more than 0.3 | not more than 1.0, containing Fe | Balance |
| | 18 | not more than 0.1 | 23.0–27.0 | not more than 2.0 | — | not more than 0.8 | not more than 1.0, containing Fe | Balance |
| | 19 | 0.75–1.25 | 23.0—27.0 | not more than 2.0 | — | not more than 0.8 | not more than 1.0, containing Fe | Balance |
| | 20 | not more than 0.1 | 28.0–32.0 | not more than 0.2 | — | not more than 0.8 | not more than 1.0, containing Fe | Balance |

With respect to this composite sliding structure, the bonding strength defined between the surface layer and the Cu-base alloy intermediate layer had been measured

TABLE 3

| Kind | Test piece No. | Composite sliding structure | | | | Marks showed in FIG. 2 |
|---|---|---|---|---|---|---|
| | | Surface layer | Bonding layer | intermediate layer | Backing material | |
| Material for comparison | 10 | Alloy consisting of 10% Sn and the balance Pb | Cu | Sample No. 3 | Steel | O |
| | 11 | " | " | Sample No. 4 | " | ● |
| | 12 | " | " | Sample No. 4 | " | Δ |
| The invention | 13 | Alloy consisting of 2.5% Cu, 6% In and the balance Pb | " | Sample No. 3 | " | X | after a lapse of 8 to 20 months. The results are shown in Table 5.

TABLE 5

| Kind | Test piece No. | Bonding strength (Kg/mm²) | Bondability of the intermediate layer and the surface layer |
| --- | --- | --- | --- |
| Material for comparison | 14 | 2.3 | X* |
| The invention | 15 | 6.0 | O** |
|  | 16 | 6.0 | O |
|  | 17 | 8.5 | O |
|  | 18 | 8.0 | O |
|  | 19 | 7.9 | O |
|  | 20 | 7.0 | O |

*Mark (X) indicates the inferior bandability.
**Mark (O) indicates the good bondability.

As was apparent from the results showed in FIG. 5, it was found that also in the composite sliding structure according to the second embodiment, the bonding strength between the surface layer and the intermediate layer was extremely superior to that of the comparison.

According to the present invention, the surface layer, the bonding layer and the intermediate layer is composed of the specific material that contains 4% or less Sn or no Sn, whereby the degradation of the bonding strength defined between the adjacent layers which degradation occurs with a lapse of time may be kept at a possible minimum level, thereby providing a composite sliding structure that is excellent in durability and fatigue resistance.

What is claimed is:

1. A composite sliding structure composed of a surface layer, a bond layer bonded to the surface layer, an intermediate layer bonded to the bond layer and a backing layer bonded to the intermediate layer, said composite sliding structure being characterized in that:

the surface layer is made of any one selected from the group consisting of (a) an alloy consisting of 0.1–6.0% Cu and the balance Pb, (b) and alloy consisting of 0.1–6.0% Cu, 0.5–16.0% In, 0.0–4.0% Sn and the balance Pb, (c) an alloy consisting of 0.5–16.0% In, 0.0–4.0% Sn and the balance Pb;

the bond layer being made of any one selected from the group consisting of an alloy consisting of 0.5–20.0% Zn and the balance N, and an alloy consisting of 0.1–4% Sn and the balance Ni;

the intermediate layer being made of any one selected from the group consisting of a single substance Al, an alloy consisting of 1.0–13.0% Si, 1.5–6.0% Zn, 4.0% or less of one or more elements selected from the group consisting of Cu, Mn, Cr, Zr, V, Pb and Sb and the balance Al, an alloy consisting of 1.5–13.0% Si, 40% or less of one or more elements selected from the group consisting of Cu, Mn, Cr, Zr, V, Pb and Sb and the balance Al, and an alloy consisting of 0.1–4% Sn, 4.0% or less of one or more elements selected from the group consisting of Cu, Mn, Cr, Zr, V, Pb and Sb and the balance Al; and the backing metal layer being made of a hard support material.

2. A composite sliding structure composed of a surface layer, an intermediate layer bonded to the surface layer and a backing metal layer bonded to the intermediate layer, said composite sliding structure being characterized in that:

the surface layer is made of any one selected from the group consisting of an alloy consisting of 3.2–5.5% Cu 0.0–4.0% Sn and the balance Pb and, an alloy consisting of 3.2–5.5% Cu, 0.5–16.0% In 0.0–4.0% Sn and the balance Pb;

the intermediate layer being made of a single substance Cu; and the backing metal layer being made of a hard support material.

* * * * *